(12) United States Patent
Petterson et al.

(10) Patent No.: US 6,978,733 B2
(45) Date of Patent: *Dec. 27, 2005

(54) DEVICE FOR CARRYING A MILKING MEMBER

(75) Inventors: Torbjörn Petterson, Gnesta (SE); Henrik Eng, Harmåker (SE); Carl-Johan Victor, Stockholm (SE)

(73) Assignee: Delaval Holding AB, Tumba (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/477,561

(22) PCT Filed: May 8, 2002

(86) PCT No.: PCT/SE02/00891

§ 371 (c)(1),
(2), (4) Date: Jan. 6, 2005

(87) PCT Pub. No.: WO02/089563

PCT Pub. Date: Nov. 14, 2002

(65) Prior Publication Data

US 2004/0194711 A1    Oct. 7, 2004

(30) Foreign Application Priority Data

May 10, 2001    (SE) .................................... 0101647

(51) Int. Cl.[7] ............................................... A01J 5/00
(52) U.S. Cl. .................................... 119/14.1; 119/14.18
(58) Field of Search ........................... 119/14.1, 14.11, 119/14.13, 14.01, 14.45, 14.18

(56) References Cited

U.S. PATENT DOCUMENTS 2,812,742 A * 11/1957 Millar ....................... 119/14.1
3,789,798 A    2/1974 Reisgles et al. ......... 119/14.08
3,870,021 A    3/1975 Nederbragt
3,938,470 A * 2/1976 Pace .......................... 119/14.1
3,999,516 A * 12/1976 Shulick ...................... 119/14.1
4,333,421 A    6/1982 Schluckboer ............ 119/14.08

(Continued)

FOREIGN PATENT DOCUMENTS

DE    19540482 A1    10/1995    ............. A01J 7/00

(Continued)

OTHER PUBLICATIONS

IBM Bulletin, Research Disclosure, Oct. 1998/1347, pp. 41442-41443 "A Service Arm for Carrying a Milking Member of a Milking Machine" (Disclosed Anonymously).

*Primary Examiner*—Teri Pham Luu
*Assistant Examiner*—Kimberly S. Smith
(74) *Attorney, Agent, or Firm*—Hovey Williams LLP

(57) ABSTRACT

The invention refers to a device for carrying a milking member, which includes four teatcups (3) and is connectable to a milking machine (5) via a flexible conduit member (6). A support element (10) is fixedly mounted at a milking box (13) for an animal to be milked and positioned with the head at the front. An arm arrangement (9) is pivotably connected to the support element and arranged to support partly the milking member during milking of the animal when the teatcups are applied to a respective teat. The arm arrangement (9) is movable from a first position beside the animal to a second position below the animal. The arm arrangement is fixedly connected to the flexible conduit member (6) at a distance from the milking member in such a way that the milking member is partly movable in relation to the arm arrangement. The device includes a force-generating member for generating, during milking, a force acting on the arm arrangement in a forward direction (x). This force is transferred to the teatcup via the conduit member.

20 Claims, 8 Drawing Sheets

U.S. PATENT DOCUMENTS

| | | | | |
|---|---|---|---|---|
| 4,838,203 A | | 6/1989 | Ellis et al. | 119/14.08 |
| 5,069,160 A | * | 12/1991 | Street et al. | 119/14.08 |
| 5,379,722 A | * | 1/1995 | Larson | 119/14.1 |
| 5,809,931 A | | 9/1998 | Ellis et al. | 119/14.08 |
| 5,967,081 A | * | 10/1999 | Street et al. | 119/14.08 |
| 6,009,833 A | * | 1/2000 | van der Lely | 119/14.02 |
| 6,289,845 B1 | * | 9/2001 | Andersson | 119/14.1 |

FOREIGN PATENT DOCUMENTS

| | | | |
|---|---|---|---|
| EP | 0630556 A1 | 5/1994 | A01J 7/00 |
| GB | 1153128 | 6/1956 | A01J 5/04 |
| GB | 1520600 | 11/1975 | |
| GB | 2154849 A | 2/1985 | |
| WO | WO 96/13150 | 5/1996 | |

\* cited by examiner

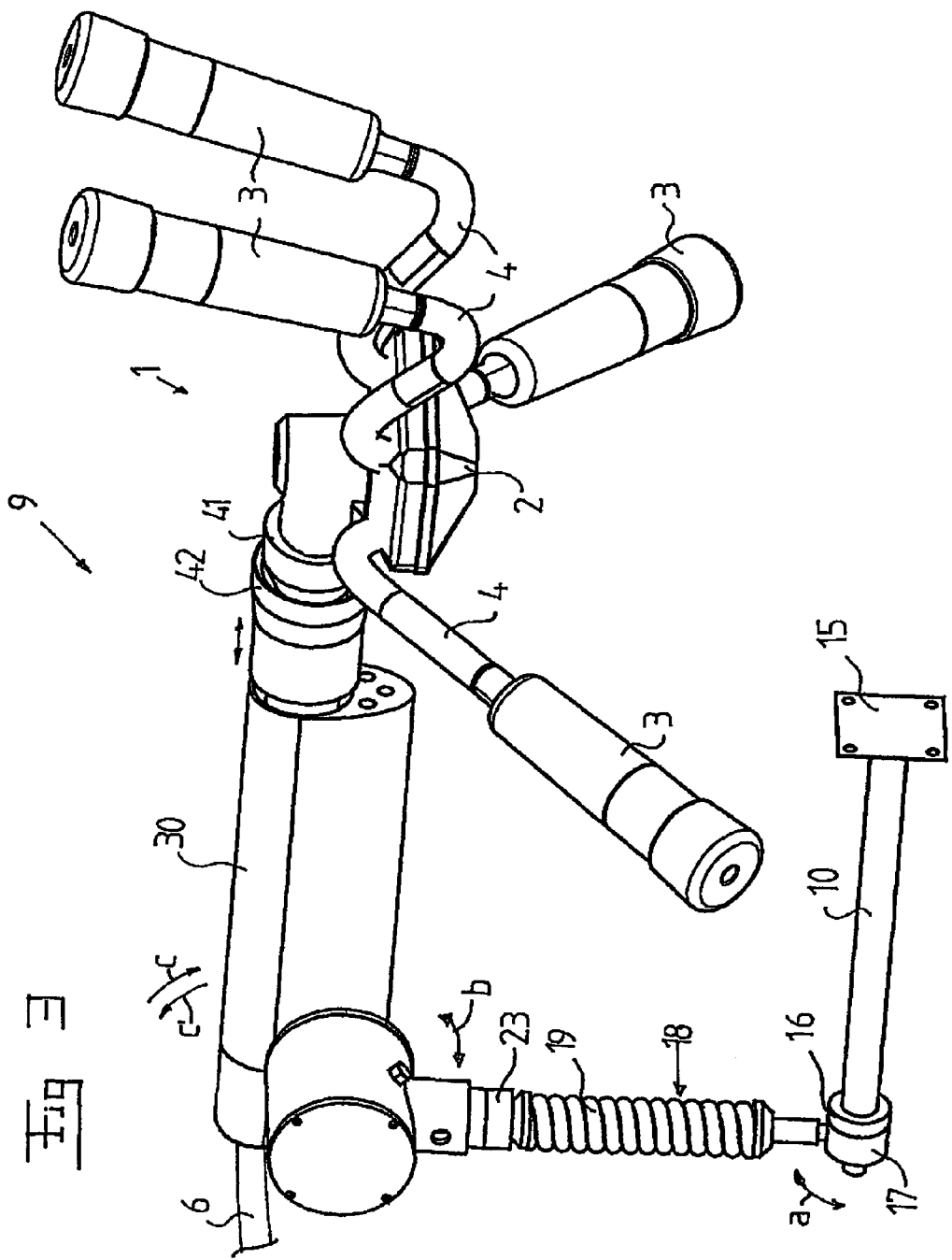

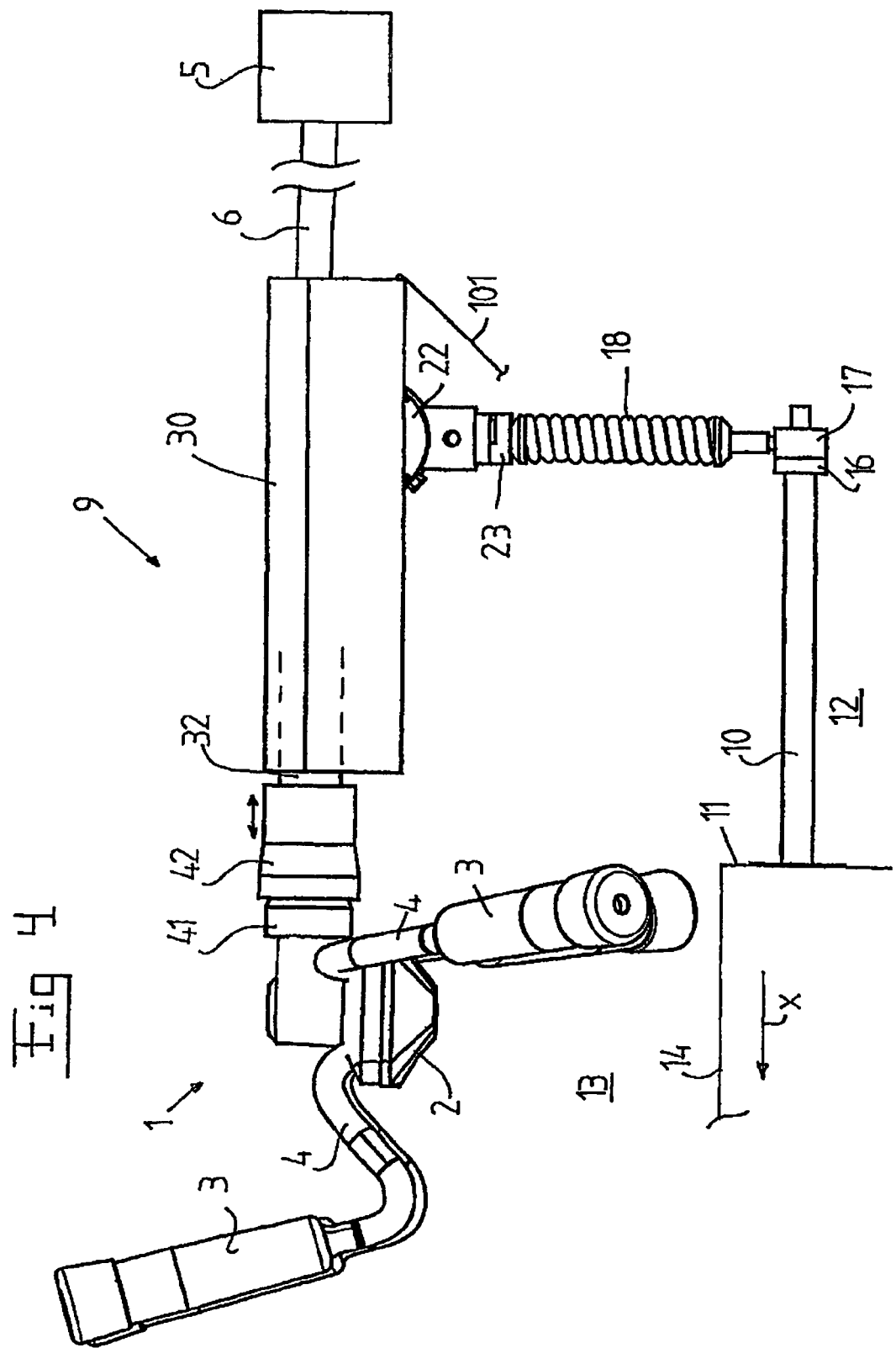

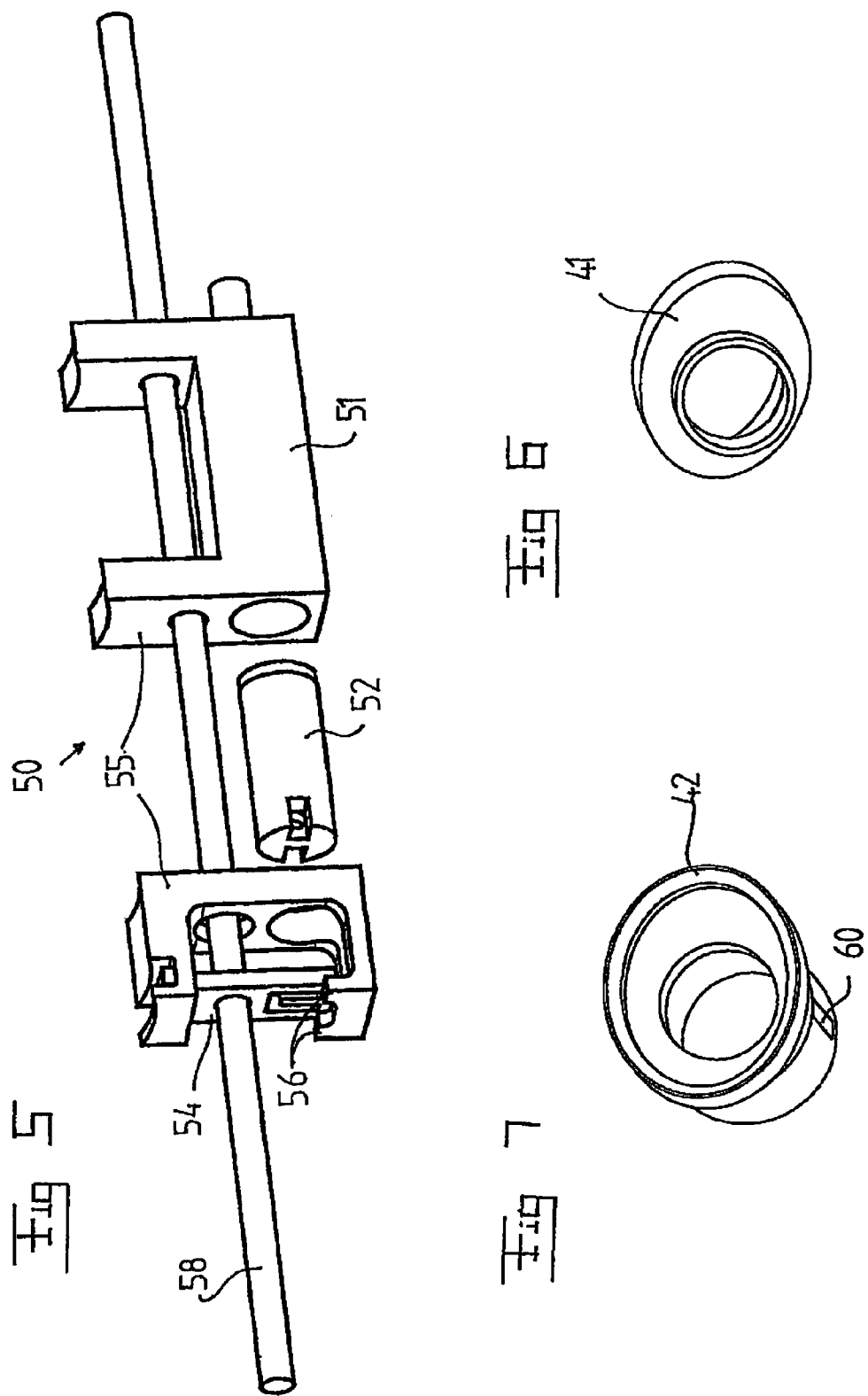

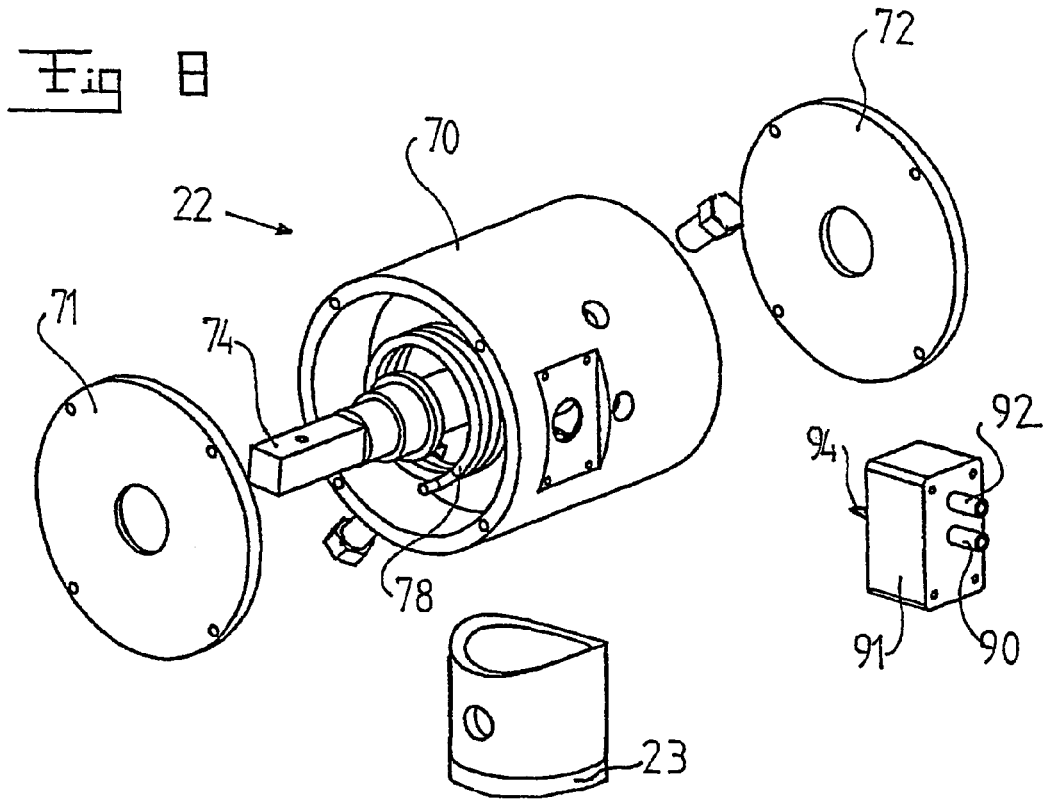
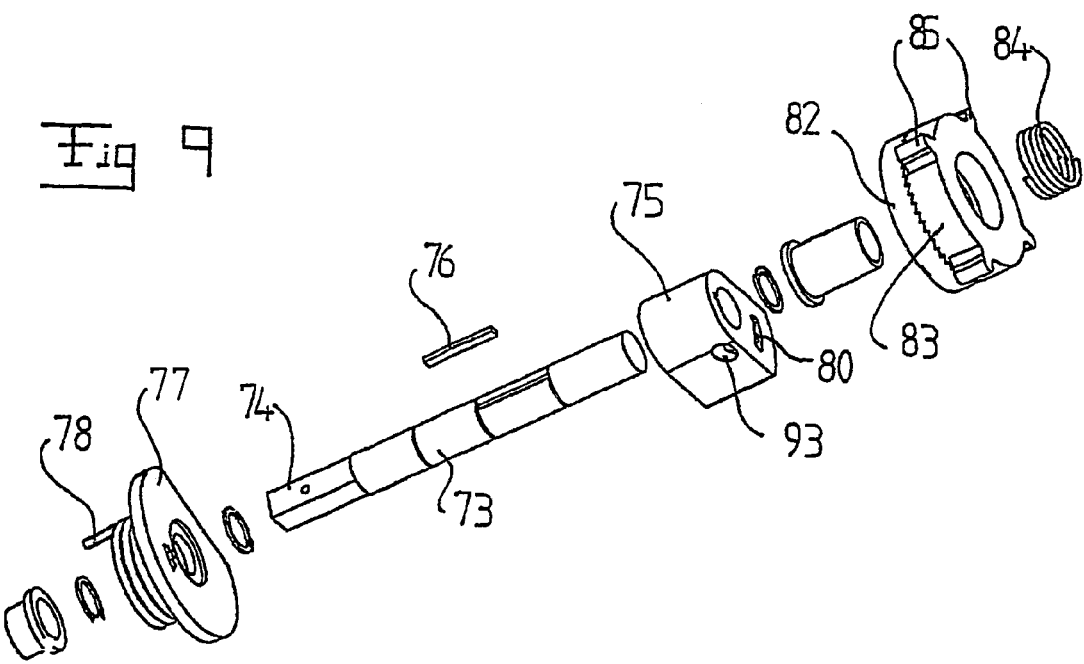

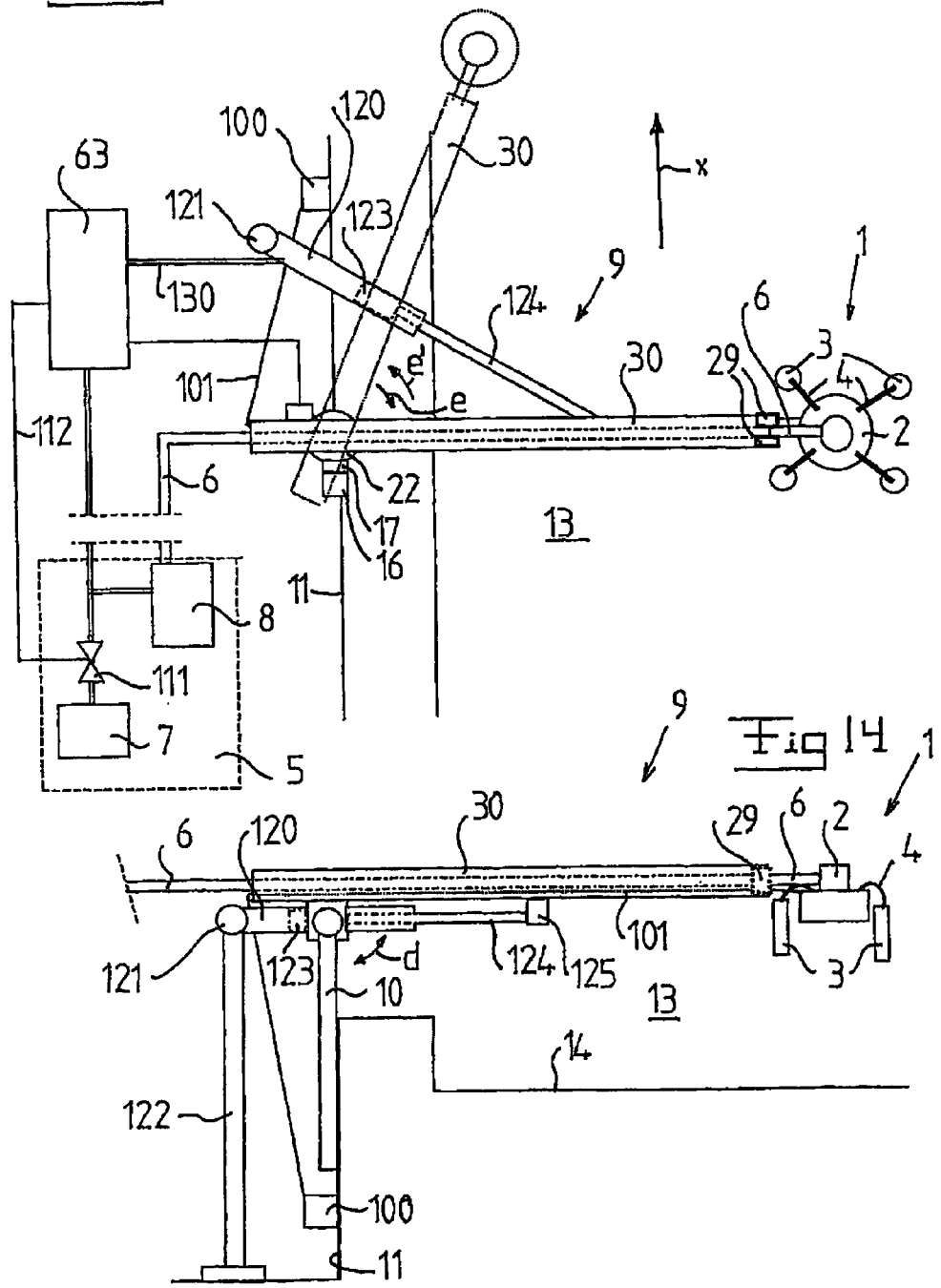

DEVICE FOR CARRYING A MILKING MEMBER

THE BACKGROUND OF THE INVENTION AND PRIOR ART

The present invention refers to a device for carrying a milking member, which includes at least one teatcup and which, via a flexible conduit member, is connectable to a milking machine arranged to provide a relatively low pressure, wherein the device includes a support element, which is fixedly mounted in or at a milking box having a front end and a rear end, and being arranged to receive an animal to be milked, wherein said animal is positioned with the head at the front end, and an arm arrangement, which is pivotably connected to the support element and arranged to support partly the milking member during milking of said animal and when said teatcup is applied to a teat of said animal, wherein the arm arrangement is movable from a first position, in which the milking member is located beside said animal, to a second position, in which the milking member is located below said animal.

A plurality of such devices for carrying a milking member are known in the patent literature. Such carrying devices, which frequently are named service arms, are in typical cases in connection with manual application of the teatcups, intended for carrying the milking member when the milking member is moved from a position beside the animal to be milked to a position below the animal. The milking member is released from the service arm by the milker, which holds the milking member with his one hand and applies the teatcups with his other hand. However, many known service arms have the disadvantage that they, during the milking proper, influence the milking member with forces in directions which are not desired.

EP-A-630556 discloses a device for carrying a claw with four teatcups. The claw is, via a flexible conduit member, connected to a milking machine which is arranged to provide a relatively low pressure. The device includes a support element, which is fixedly mounted in or at a milking box arranged to receive an animal to be milked, and an arm arrangement, which is pivotably connected to the support element and arranged to support the milking member in connection with the application of the teatcups and also during the milking proper. Furthermore, the device includes a force-generating member arranged to generate a force acting forwardly on the claw during the milking. The claw is however only connected to the arm arrangement in a loose manner via a schematically disclosed connection. The long milk conduit hangs apparently substantially loosely under the arm arrangement.

SUMMARY OF THE INVENTION

The object of the present invention is to provide a device offering an advantageous support for a milking member during the milking of an animal.

This object is achieved by the device initially defined, which is characterised in that the arm arrangement by means of a connecting member is fixedly connected to the flexible conduit member at a distance from the milking member in such a way that the milking member is partly movable in relation to the arm arrangement, and that the device includes a force-generating member, which, during milking, is arranged to generate a force acting on the arm arrangement in a forward direction, wherein this force is transferred to said teatcup via the conduit member.

In such a way a very favourable influence on the milking member and the teats is achieved during the milking. It is thus possible to avoid that the milking member influences the teats in such a way that the milk flow through the teat channel of the respective teat is hindered. The force is applied via the conduit member, and thus no direct connection of any mechanical component on the milking member is needed.

According to an embodiment of the invention, the force-generating member is arranged to generate force with a size that is substantially independent of the position of the arm arrangement during the milking. Different animals have different sizes, for instance the udder of older cows is normally lower than the udder of younger cows. It is thus advantageous that the generated force is independent of the position of the milking member, for instance if it is located at a relatively high position or a relatively low position. With a member generating such a force with a substantially constant size, the forwardly directed force will be substantially equal even if the animal moves in the box during the milking. Such a force may for instance be obtained by means of a force-generating member, which includes a cylinder which includes a piston that is displaceable in the cylinder through the supply or discharge of a fluid.

According to a further embodiment of the invention, the arm arrangement is arranged to permit a relatively free movability of the milking member in a vertical direction during the milking. In such a way it is possible to achieve a resulting force acting on the teats in a direction obliquely downwards and forwards.

According to a further embodiment of the invention, the arm arrangement includes a tubular arm element, through which the conduit member extends, wherein the connecting member is provided at an outer end of the arm element. Advantageously, the device may include a balancing member which, during the milking, is arranged to balance the weight of the arm element and the conduit member.

According to a further embodiment of the invention, the tubular arm element is designed as a telescope arm with at least a first part and a second outer part, wherein the second outer part is displaceable in relation to the first part. Such a telescope arm may in an easy manner be pulled out to a desired length so that the teatcups reach the respective teat. A telescope arm may also be moved together so that it takes up a little space, and it may easily be turned away for enabling other activities, such as cleaning of the udder etc.

According to a further embodiment of the invention, the first part of the telescope arm includes one of said cylinder and piston, wherein the second part of the telescope arm includes the other of said cylinder and piston. Advantageously, the cylinder may be formed by the first part of the telescope arm and the piston by the second part of the telescope arm.

According to a further embodiment of the invention, the arm arrangement includes a rotary member, which is arranged to permit rotation of the arm element in a first rotary direction about a rotary axis of the rotary member during the movement of the arm arrangement from the first position to the second position. The rotary member may advantageously be connected to the first part of the telescope arm. Furthermore, the rotary member may be connected to the support element.

According to a further embodiment of the invention, the milking member includes a claw, which is connected to the conduit member, and four teatcups, which are connected to the claw via a respective short milk conduit.

BRIEF DESCRIPTION OF THE DRAWINGS

The present invention is now to be explained more closely by means of various embodiments and with reference to the drawings attached.

FIG. 3 discloses a perspective view of an embodiment of a device according to the invention.

FIG. 4 discloses a side-view of the device in FIG. 3.

FIG. 5 discloses schematically an exploded view of a force-generating member of the device in FIGS. 1–4.

FIG. 6 discloses a perspective view of a first locking part of the device in FIGS. 1–4.

FIG. 7 discloses a perspective view of a second locking part of the device in FIGS. 1–4.

FIG. 8 discloses schematically a partly demounted rotary member of the device in FIGS. 1–4.

FIG. 9 discloses a perspective view of a number of components of the rotary member in FIG. 8.

FIG. 13 discloses a view from above of a device according to a second embodiment of the invention.

FIG. 14 discloses a side-view of the device in FIG. 13.

DETAILED DESCRIPTION OF VARIOUS EMBODIMENTS OF THE INVENTION

Figure 1:
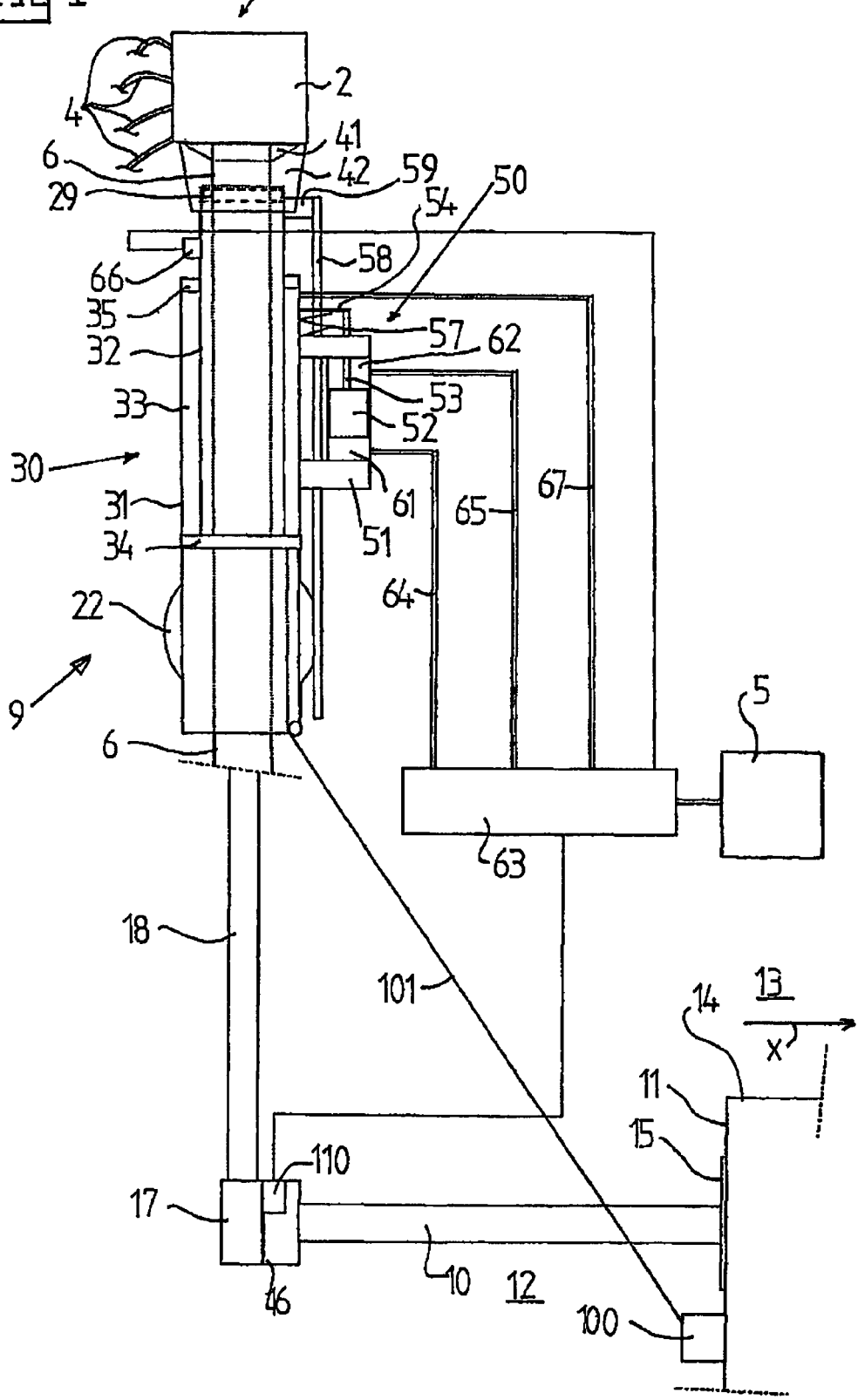
FIG. 1 discloses schematically a side-view of a device according to a first embodiment of the invention in a first position.
Figure 2:
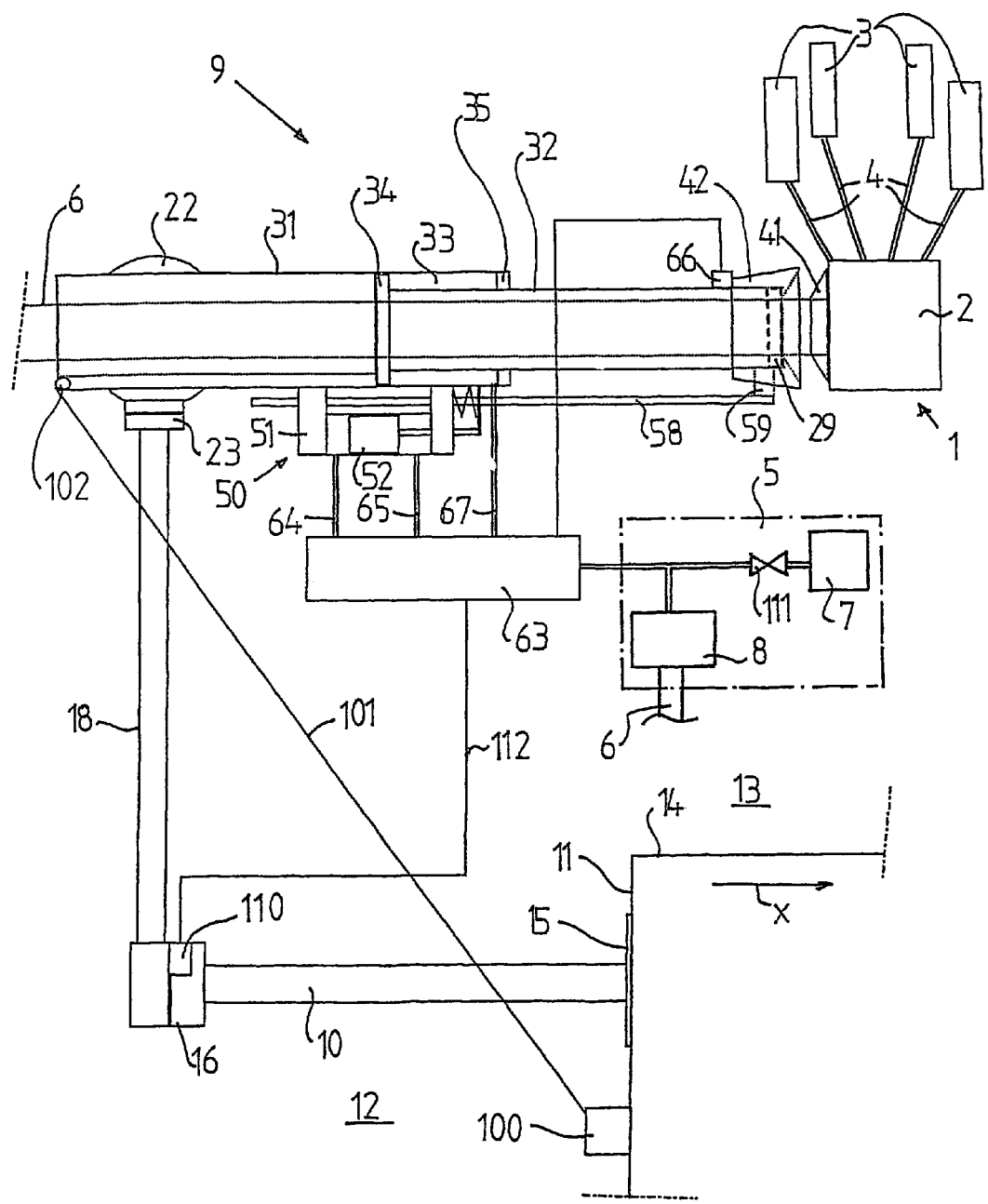
FIG. 2 discloses schematically a side-view of a device in FIG. 1 in a second position.

FIGS. 1–2 disclose a device arranged to carrying a milking member 1. The milking member 1 includes a schematically disclosed claw 2 and four teatcups 3, see FIGS. 2–4. The teatcups 3 are connected to the claw 2 via a respective short milk conduit and a respective short pulse conduit (not disclosed). The milking member 1 thus has a conventional design known per se. Furthermore, the milking member 1 is in a conventional manner connected to a milking machine 51 which is disclosed schematically in FIGS. 1, 2 and 4 via a conduit member 6, which at least includes a long milk conduit and/or at least a long pulse conduit. The milking machine 5 includes a vacuum pump 7 and a milk collecting member 8.

The device according to the invention includes an arm arrangement 9 and a support element 10. The support element 10 is in the embodiment disclosed attached to a substantially vertical wall 11 in a milking parlour. In the milking parlour 12, the milker is present, the purpose of whose is to apply the teatcups 3 to the teats of the animal to be milked. The animal (not disclosed) is standing in a milking box 13, the ground 14 of which is indicated in FIGS. 1–4. In the embodiment disclosed, it is intended that the cow is standing with her rear part turned to the milking parlour 12 and thus having the head turned forwardly in the direction x from the milking parlour 12. The support element 10 is attached to the substantially vertical wall 11 by means of an attachment plate 15 and extends substantially horizontally outwardly from the wall 11. The support element 10 includes at its outer end a swing joint 16, which includes a swingable part 17 on which a swing arm 18 of the arm arrangement 9 is provided. The swing arm 18 is thus swingable in a substantially vertical plane in a rotary direction a, see FIG. 3. The swing arm 18 is partly formed by a spring element 19, which gives a limited elasticity to the swing arm 18. The swing arm 18 is swingable between at least a substantially vertical position, which is disclosed in FIGS. 1–4, and a rest position (not disclosed) in which the swing arm 18 has been swinged laterally so that it extends with an angle of inclination of about 10–50° in relation to a horizontal plane. In such a way, the arm arrangement 9 may be turned away in the rest position and the milker has free access for cleaning of the udder of the animal present in the milking box 13.

Furthermore, the arm arrangement 9 includes a rotary member 22, which is provided at the upper end of the swing arm 18. The rotary member 22 is connected to the swing arm 18 by means of a further rotary joint 23 permitting the rotation of the rotary member 22 in a rotary direction b about a rotary axis being substantially concentric with the swing arm 18.

Furthermore, the arm arrangement 9 includes a telescope arm 30, which is provided on the rotary member 22. The telescope arm 30 is rotatable in a rotary direction c between a first, substantially vertical position, see FIG. 1, and a second substantially horizontal position, see FIG. 2-4. It is to be noted that the second substantially horizontal position may incline upwards or downwards depending on the animal to be milked. The telescope arm 30 is rotatable by means of a mechanism of the rotary member 22. This mechanism is to be explained more closely below. The telescope arm 30 includes a first part 31 and a second part 32. The second part 32 is projectable out from and introduceable into the first part 31. The second part 32 thus functions as a piston in the first part 31 that functions as a cylinder. Between the first part 31 and second part 32 a space 33 is formed, which is sealed from the environment by means of a piston ring 34 that is fixedly connected to the second part 32 and a cylinder ring 35 that is fixedly connected to the first part 31. The telescope arm 30 is tubular and arranged to receive the conduit member 6 extending through the whole telescope arm 30. The conduit member 6 is fixedly connected to the second part 32 and more specifically in the forward end of the second part 32 by means of elastic clamping jaws 29 or any similar connecting member. The position of the milking member 1 in relation to the second part 32 of the telescope arm 30 is thus fixed and the milking member 1 is located at a small distance from the second part 32, which distance permits a certain movability of the milking member 1 in relation to the telescope arm 30 thanks to the flexibility of the conduit member 6 connecting the second part 32 and the milking member 1, see FIG. 2.

Thanks to the above described movabilities of the arm arrangement 9 a moving pattern according to the following is obtained. In a rest position of the device, the swing arm 18 is turned downwards to the rest position mentioned above. In this rest position, the telescope arm 30 extends in substantially the same direction as the swing arm 18. When the milking member 1 is to be applied, the milker grips two of the teatcups 3 and pull them upwardly so that the swing arm 18 takes the substantially vertical position. When this movement of the swing arm 18 is initiated also the vacuum application is activated, which is to be explained more closely below. At the same time or immediately after the achievement of the vertical position, the milker moves the two teatcups 3 forwardly, wherein the telescope arm 30 will be turned downwardly and the second part 32 of the telescope arm 30 is pulled outwardly to the substantially horizontal position disclosed in FIG. 2. By means of a small lifting of the teatcups 3 and the telescope arm 20, the arm arrangement 9 is locked in the position achieved, which is to be explained more closely below. Consequently, the teatcups 3 may in an easy manner be applied two and two to the teats of the animal without the need for the milker to hold the claw 2 proper.

The device also includes a first locking member including a first locking part 41, which is fixedly connected to the milking member 1, and a second locking part 42, which is displaceably provided on the projectable second part 32 of the telescope arm 30. The second locking part 42 is displaceable between a locking position (see FIG. 1), in which the second locking part 42 is in locking engagement with the first locking part 41, and thus locks and fixes the milking member in relation to the telescope arm 30, and a releasing position (see FIG. 2), in which the second locking part 42 is not in engagement with the first locking part 41, wherein the milking member 1 is partly movable in relation to the telescope 30 thanks to the flexibility of the conduit member 6. The first locking part 41 is disclosed more closely in FIG. 6 and the second locking part 42 is disclosed more closely in FIG. 7.

Furthermore, the arm arrangement 9 includes a second locking member 50, which is arranged to permit the projecting of the second part 32 of the telescope arm 30 out from the first part 31 and the locking of the second part 32 in relation to the first part 31 in an opposite movement direction. The second locking member 50 is disclosed in FIGS. 1, 2 and 5. The second locking member 50 includes a cylinder 51, which is fixedly provided on a first part 31 of the telescope arm 30, and a piston 52, which is movably provided in the cylinder 51. The piston 52 is connected to a piston rod 53, which in turn is pivotably connected by a locking washer 54. The locking washer 54 is also pivotably connected to the first part 31 or, as is disclosed in FIG. 5, a housing 55 housing the cylinder 51 and substantially all components of the locking member 50. The locking washer 54 is biased in a direction forwardly to abutment against a stop shoulder 56 by means of a spring 57. The locking washer 54 includes an opening through which a rod 58 extends in a displaceable manner. The rod 58 is in its forward end via an attachment 59 fixedly connected to the second part 32 of the telescope arm 30. The attachment 59 extends through a longitudinal slot 60 in the second locking part 42. If the rod 58 is displaced forwardly, i.e. when the second part 32 moves outwardly from the first part 31, a forwardly directed force will be applied to the locking washer 54 in such a way that it comes to a position in which it does not prevent the continuing forwardly directed movement of the rod 58. By means of the cylinder 51 and the piston 52 the locking washer 54 may however be pulled rearwardly, wherein it by means of an inclined position will prevent the rod 58 from moving rearwardly and thus the introduction of the second part 32 into the first part 31. The cylinder 51 forms two cylinder spaces 61, 62, one on each side of the piston 52. These cylinders spaces 61, 62 are connected to a control unit 63 via a respective vacuum conduit 64, 65. The control unit 63 is arranged to apply a vacuum to one of said spaces 61, 62. The vacuum, or a relatively low pressure, is supplied by the vacuum pump being a component in the schematically disclosed milking machine 5. If a vacuum is supplied to the space 61 via the conduit 64 the locking washer 54 will thus be pulled rearwardly and lock the first part in the position achieved. If the vacuum is applied to the space 62 via the conduit 65, the locking washer 54 will be displaced forwardly towards the stop shoulder 56 and thus permit the second part 32 to move freely in relation to the first part 31.

The device also includes a sensor 66 of an electric or pneumatic type, which is provided on the second part 32. The sensor 66 is arranged to detect when the second locking part 42 is pulled rearwardly and thereby initiate the milking state of the device by delivering a signal to the control unit 63, which then applies a vacuum to the space 62, which releases the second part 32, and to the space 33, via a conduit 67, which creates a force acting on the milking member 1 during the milking and extending in a forward direction x. Furthermore, the control unit 63 will interrupt the vacuum supply to the rotary member 22, which is to be described more closely below. The telescope arm 30 thus functions during the milking as a force-generating member exerting a forwardly directed force in the forward direction x to the milking member 1 and the teatcups 3. By the forward direction x is meant a direction towards the forward end of the box, and towards the forward part of the animal to be milked.

Furthermore, the arm arrangement 9 includes a third locking member, which is comprised by the rotary member 22 and which is arranged to enable locking of the telescope arm 30 in a reached rotary position. This locking is achieved by the rotation of the telescope arm 30 in a second rotary direction c', which is opposite to the first rotary direction c. The function of this locking appears from the following description of the rotary member 22, see FIGS. 8–12. The rotary member 22 includes a housing 70 with two end pieces 71 and 72, which are fixedly provided on the housing 70. A shaft 73 extends through the housing 70 and an opening in the respective end piece 71, 72. The shaft 73 includes a pin 74, which is fixedly connected to the telescope arm 30 in such a way that the telescope arm 30 is not rotatable in relation to the shaft 73. A piston housing 75 is fixedly provided on the shaft 73 by means of a locking wedge 76. A cam-disc 77 is fixedly provided on the piston housing 75 and thus also the cam-disc 77 is fixed in relation to the shaft 73. A torsion spring 78 is with a first end attached to the end piece 71 and with a second end to the cam-disc 77.

The torsion spring 78 is designed in such way that it exerts a lifting force to the telescope arm 30 in the position disclosed in FIG. 2. This lifting force of the torsion spring 78 will thus function as a balancing member in the position disclosed in FIG. 2. It is to be noted that the torsion spring 78 exerts a force which only corresponds to the weight of the arm 30 and the conduit member 6, and thus not the weight of the milking member 1 and the teatcups 3.

Figure 10:
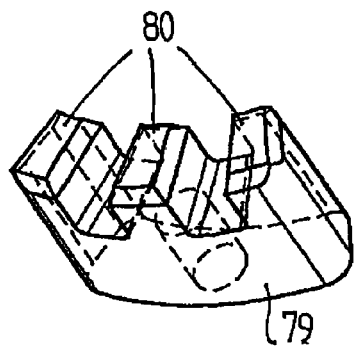
FIG. 10 discloses a perspective view of a piston of the rotary member in FIG. 8.
Figure 11:
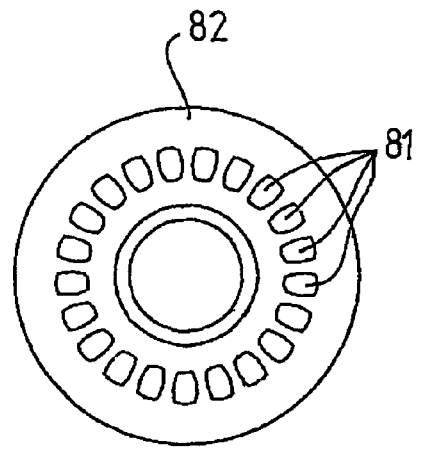
FIG. 11 discloses a view of a tooth washer of the rotary member in FIG. 8.
Figure 12:
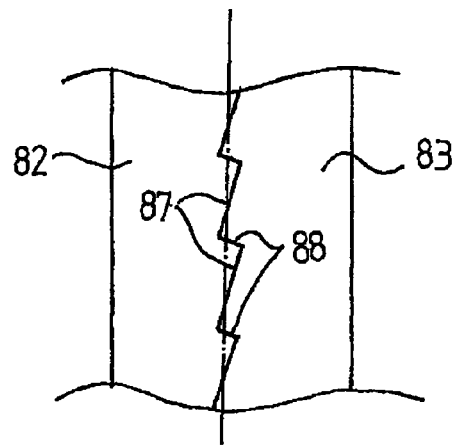
FIG. 12 discloses a view of a part of two tooth washers of the rotary member in FIG. 8.

The piston housing 75 includes a piston 79, see FIG. 10, which is project able out from the piston housing 75. The piston 79 includes one or several projections 80, in the embodiment disclosed three projection 80, which are arranged to engage three opening 81 of a first tooth washer 82, see FIG. 11. The first tooth washer 82 is rotatably provided on the shaft 73 and when the piston 79 is displaced out from the piston housing 75 the first tooth washer 82 will thus be locked in relation to the shaft 73. The first tooth washer 82 is arranged to co-operate with a second tooth washer 83, which is provided in the housing 70 in such a way that it is displaceable in the longitudinal direction of the shaft 73 against the action of a compression spring 84, but not rotatable in relation to the housing 70 thanks to four projections 85 which are in engagement with grooves (not disclosed) of the inner wall of the housing 70. The tooth washers 82 and 83 include a respective tooth ring with first flanks 87 with a relatively plane inclination and second flanks 88 with a relatively steep inclination, see FIG. 12. When the piston 79 is in projected position and thus in engagement with the first tooth washer 82, the rotary axis 73, and thus the telescope arm 30, will be relatively fixed in relation to the rotary member 22 and the swing arm 18. Thanks to the relatively plane flanks 87, the rotary shaft 73 and the telescope arm 30 may be rotated upwards by overcoming a relatively small force. It is also possible to rotate the telescope arm 30 and the shaft 73 downwards by overcoming a relatively large force thanks to the inclined, relatively steep flanks 88.

The position of the piston 79 in the piston housing 75 is controlled by means of the application of a vacuum via the control unit 63. The piston housing 75 is connected to the control unit 63 (see FIG. 1) via a vacuum conduit 90, which is connected to a shut-off valve 91. From the shut-off valve 91 a vacuum conduit 92 extends further to a connection 93 of the piston housing 75. The shut-off valve 91 includes a manoeuvring pin 94 the position of which is controlled by the cam-disc 77. When the telescope arm 30 is rotated downwards, the manoeuvring pin 94 will abut the peripheral surface of the cam-disc 77 and by means of friction be maintained in an upwardly directed position, wherein the shut-off valve 91 is closed and no vacuum is applied to the piston housing 75. During this movement, the piston 79 is pulled into the piston housing 75, and the telescope arm 30 and the shaft 73 are thus freely rotatable in relation to the rotary member 22. When the desired position of the telescope arm 30 has been reached, the telescope arm 30 is somewhat lifted, wherein the manoeuvring pin 94 is rotated downwards and opens the shut-off valve 91, wherein vacuum is applied to the piston housing 75. Consequently, the piston 79 will be projected outwardly against the action of a compression spring (not disclosed) and engage the tooth washer 82, wherein the telescope arm 30 is locked in the rotary position achieved. A relative locking or fixing of the telescope arm 30 in this rotary position is thus achieved. As mentioned above, it is however thanks to the flanks 87, 88 possible to rotate the telescope arm 30 by applying a small and large rotary force, respectively. When the locked rotary position is to be released, the supply of the relatively low pressure is interrupted by means of the control unit 63, wherein the compression spring mentioned above retracts the piston 79 out of engagement with the tooth washer 82.

Furthermore, the device includes a removing member 100 with a rotary motor of a pneumatic, hydraulic or electric type. The drive motor of the removing member 100 is connected to a pulling line 101, which extends via a guide 102 into the telescope arm 30 and is connected to the projectable second part 32. Removal of the milking member 1 is initiated in a conventional manner via the control unit 63 when the milking is to be finished. The drive motor of the removing member 100 will thus pull the pulling line 101 and the second part 32 rearwardly, wherein the teatcups 3 are pulled off from the teats of the animal. At the same time the vacuum application to the cylinder 51 and the piston housing 75 is deactivated, via the control unit 63, in such a way that the arm arrangement 9 will be freely movable. When the second part 32 has been pulled into the first part 31, the telescope arm 30 is rotated upwardly by means of a continuing pulling in the pulling line 101, and the swing arm 18 is swinged downwardly and laterally. This moving pattern may be obtained by means of a suitable location of the drive motor of the removing member 100.

The device also includes an activating device with a sensing member 110 (see FIG. 1), which in the embodiment disclosed is provided at the swing joint 16. When the swing arm 18 is swinged in relation to the support element 10, the sensing member 110 will activate the control unit 63 by a signal, wherein the control unit 63 initiates the vacuum application to the various components of the device and to the milking member 1 and the teatcups 3. This is obtained by opening of a schematically disclosed closing valve 111 of the milking machine 5. The sensing member 110 is arranged to be activated as soon as the swinging of the swing arm 18 from the downwardly turned rest position is initiated. The sensing member 110 may of course be located in many different positions and in many different manners of the device, for instance at the rotary member 22, the rotary joint 23 and/or the telescope arm 30. The sensing member 110 may include a mechanical element, which is brought to a movement when the swing arm 18 is swinged, or include optical, inductive or any similar member for sensing a movement of the swing arm 18. The sensing member 110 is connected to the control unit 63 via a connecting member 112 of electric, pneumatic, hydraulic or mechanical type.

The embodiment disclosed in FIGS. 1–12 refers to an arm arrangement, which is primarily intended for introduction between the rear legs of the animal to be milked.

FIGS. 13 and 14 disclose a second embodiment that refers to an arm arrangement, which primarily is intended for being introduced from the side of the animal to be milked. It is to be noted that the same reference signs have been used in the description of all embodiments for components with the same or a similar function.

The device according to the second embodiment includes an arm arrangement 9 and a support element 10. The support element 10 is also in the second embodiment attached to a substantially vertical wall 11 in a milking parlour 12. The animal (not disclosed) stands in a milking box 13 with the head directed in the direction x in parallel with the milking parlour 12. The support element 10 extends substantially vertically and in parallel with the wall 11. The support element 10 includes at its outer end a swing joint 16 which includes a swingable part 17 on which a rotary member 22 of the arm arrangement 9 is provided.

The arm arrangement also includes a tubular arm element 30 that is connected to the rotary member 22. As appears from FIGS. 13 and 14, the conduit member 6 extends through the tubular arm element 30. The conduit member 6 is fixedly connected to the arm element 30 and more precisely in the forward end of the arm element 30 by means of elastic clamping jaws 29 or any similar connecting member. Also the second embodiment may include locking parts of the type disclosed in the first embodiment for locking the milking member during the movement from the first position to the second position.

The arm element 30 is swingable in a vertical plane in a rotary direction d by means of the swing joint 16. The arm element 30 is also swingable in a substantially horizontal plane in a rotary direction e, e' about an axis of the rotary member 22 between a first position beside the animal to be milked and a second position below the animal to be milked.

According to the second embodiment the following movement pattern is achieved for the arm arrangement 9. In a rest position of the device, the arm element 30 is rotated to the first position, which is indicated with dashed lines in FIG. 13 and in which the arm element 30 extends substantially in parallel with the box 13 and the direction x. When the milking member 1 is to be applied, the milker grips two of the teatcups 3 and pulls them inwardly so that the arm element 30 takes the second position disclosed with continuous lines in FIG. 13. When this movement of the arm element 30 is initiated, also the vacuum application is activated in the same way as in the first embodiment. The rotary member 22 may also in the second embodiment be arranged to lock the arm element 30 in the second position in a similar way as in the first embodiment in order to permit the application of the teatcups 3 without requiring that the milker holds the claw 2 proper.

The torsion spring 78, which is described in the first embodiment, may in the second embodiment be provided in the swing joint 16 and arranged to exert a lifting force to the arm element 30 and to balance the weight of the arm element 30 and the conduit member 6 during the milking.

The device according to the second embodiment also includes a force-generating member in the form of a pneumatic cylinder 120, which during the milking generates a force acting on the arm element 30 substantially in the direction x. The generated force is transferred to the teatcups 3 via the conduit member 6, the claw 2 and the milk conduits 4. Such a cylinder 120 may generate a substantially uniform force independent of the position of the arm arrangement during the milking. The cylinder 120 is via a joint 121 connected to a stationary support member 122. The cylinder 120 is swingable in a horizontal plane and in a vertical plane. The cylinder 120 forms a space in which a piston 123 is movably provided. The piston 123 is connected to a piston rod 124 that via a joint 125 is connected to the arm element 30. The piston rod 124 is also swingable in all directions in relation to the arm element 30. In the second embodiment, the piston rod 124 will be pulled into the cylinder 121 when a relatively low pressure is applied to the space in the cylinder 120, i.e. the arm element 30 is pulled towards the first position and a force, which extends in a forward direction, is exerted to the teatcups 3. The low pressure may be applied by means of the vacuum pump 7 of the milking machine 5 via a vacuum conduit 130 and the control unit 63, which for instance may initiate the application the low pressure when it receives a signal from a sensor of the type defined in the first embodiment.

The device according to the second embodiment also includes an activating device with a sensing member 110 (see FIG. 13), which in the embodiment disclosed is provided on the arm element 30 in the proximity of the rotary member 22. When the arm element 30 is rotated in relation to the support element 10, the sensing member 110 will activate the control unit 63 by a signal, wherein the control unite 63 initiates the vacuum application to the various components of the device and to the milking member 1 and the teatcups 3. This may be obtained by opening of the schematically disclosed shut-off valve 111 of the milking machine 5 in the same way as in the first embodiment, or alternatively by starting the vacuum pump of the milking machine 5. The sensing member 110 is arranged to be activated as soon as the rotation of the arm element 30 from the first position is initiated. The sensing member 110 may of course be located in many different positions and in many different ways of the device according to the second embodiment, for instance at the swing joint 16, the cylinder 120, the joint 1212 and/or the joint 125. Furthermore, the sensing member 110 may include a mechanical element which is brought into am movement when the arm element 30 is rotated, or include optical, inductive or any similar member for sensing of a movement of the arm element 30.

The invention is not limited to the embodiments disclosed but may be varied and modified within the scope of the following claims. It is to be noted that the force-generating member for achieving a substantially uniform force may be realised also in other ways than with the pneumatic cylinders 30, 120 disclosed, for instance pneumatic cylinders being supplied with pressurised air, hydraulic cylinders, rotation motors of electric, pneumatic, or hydraulic type, electrical linear motors etc.

What is claimed is:

1. A device for carrying a milking member, which includes at least one teatcup and which, via a flexible conduit member, is connectable to a milking machine arranged to provide a relatively low pressure, wherein the device includes:

a support element, which is fixedly mounted in or at a milking box having a front end and a rear end and being arranged to receive an animal to be milked, wherein the animal is positioned with the head of the animal at the front end, and an arm arrangement, which is pivotably connected to the support element and arranged to support partly the milking member during milking of the animal and when said teatcup is applied to a teat of the animal, wherein the arm arrangement is movable from a first position, in which the milking member is located beside said the animal, to a second position, in which the milking member is located below the animal, wherein the arm arrangement by means of a connecting member is fixedly connected to the flexible conduit member at a distance from the milking member in such a way that the milking member is partly movable in relation to the arm arrangement, and wherein the device includes a force-generating member, which, during milking, is arranged to generate a force acting on the arm arrangement in a forward direction, wherein this force is transferred to said teatcup via the conduit member.

2. A device according to claim 1, wherein the force-generating member is arranged to generate a force of a size that is substantially independent of the position of the arm arrangement during milking.

3. A device according to claim 1, wherein the force-generating member includes a cylinder, which includes a piston that is displaceable in the cylinder through the supply or the discharge of a fluid.

4. A device according to claim 1, wherein the arm arrangement is arranged to permit a relatively free movability of the milking member in a vertical direction during the milking.

5. A device according to claim 1, wherein the arm arrangement includes a tubular arm element through which the conduit member extends, wherein the connecting member is provided at an outer end of the arm element.

6. A device according to claim 5, wherein the device includes a balancing member which, during the milking, is arranged to balance the weight of the arm element and the conduit member.

7. A device according to claim 5, wherein the tubular arm element is designed as a telescope arm with at least a first part and a second outwardly projectable part, wherein the second outer part is displaceable in relation to the first part.

8. A device according to claim 2, wherein the arm arrangement includes a tubular arm element through which the conduit member extends, wherein the connecting member is provided at an outer end of the arm element and wherein the tubular arm element is designed as a tubular arm with at least a first part and a second outwardly projectable part, the second outwardly projectable part being displaceable in relation to the first part, and wherein the first part of the telescope arm includes one of said cylinder and piston, wherein the second outwardly projectable part of the telescope arm includes the other of said cylinder and piston.

9. A device according to claim 8, wherein the cylinder is formed by the first part of the telescope arm and by the piston of the second outwardly projectable part of the telescope arm.

10. A device according to claim 4, wherein the arm arrangement includes a rotary member and a tubular arm element, wherein the tubular arm element is connected to the rotary member, which is arranged to permit rotation of the arm element in a first rotary direction about a rotary axis of the rotary member during the movement of the arm arrangement from the first position to the second position.

11. A device according to claim 10, wherein the tubular arm element is designed as a telescope arm with at least a first part and a second part, wherein the second outwardly projectable part is displaceable in relation to the first part and wherein the rotary member is connected to the first part of the telescope arm.

12. A device according to claim 10, wherein the rotary member is connected to the support element.

13. A device according to claim 1, wherein the milking member includes a claw, which is connected to the conduit member, and four teatcups, which are connected to the claw via a respective short milk conduit.

14. A device according to claim 2, wherein the force-generating member includes a cylinder which includes a piston that is displaceable in the cylinder through the supply or the discharge of a fluid.

15. A device according to claim 2, wherein the arm arrangement is arranged to permit a relatively free movability of the milking member in a vertical direction during the milking.

16. A device according to claim 2, wherein the arm arrangement includes a tubular arm element through which the conduit member extends, wherein the connecting member is provided at an outer end of the arm element.

17. A device according to claim 2, wherein the milking member includes a claw which is connected to the conduit member, and four teatcups which are connected to the claw via a respective short milk conduit.

18. A device according to claim 6, wherein the tubular arm element is designed as a telescope arm with at least a first part and a second outwardly projectable part, wherein the second outwardly projectable part is displaceable in relation to the first part.

19. A device according to claim 18, wherein the arm arrangement includes a rotary member, wherein the tubular arm element is connected to the rotary member, which is arranged to permit rotation of the arm element in a first rotary direction about a rotary axis of the rotary member during the movement of the arm arrangement from the first position to the second position.

20. A device according to claim 11, in that the rotary member is connected to the support element.

* * * * *